United States Patent
Thomas et al.

(10) Patent No.: US 11,634,049 B2
(45) Date of Patent: Apr. 25, 2023

(54) LOWER AND UPPER LATCH ANCHOR USE DETECTION SENSING DEVICE

(71) Applicant: GM Global Technology Operations LLC, Detroit, MI (US)

(72) Inventors: Scott D. Thomas, Novi, MI (US); Tricia E. Morrow, Grosse Pointe, MI (US); Dorel M. Sala, Troy, MI (US); Eugene J. Lau, Mississauga (CA); Suzanne L. Johansson, Rochester Hills, MI (US); Orhan Demirovic, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/749,412

(22) Filed: May 20, 2022

(65) Prior Publication Data

US 2022/0274511 A1 Sep. 1, 2022

Related U.S. Application Data

(62) Division of application No. 16/655,808, filed on Oct. 17, 2019, now Pat. No. 11,358,499.

(51) Int. Cl.
*B60N 2/28* (2006.01)
*B60N 2/00* (2006.01)
*B60R 22/48* (2006.01)

(52) U.S. Cl.
CPC .............. *B60N 2/28* (2013.01); *B60N 2/002* (2013.01); *B60R 22/48* (2013.01); *B60R 2022/4858* (2013.01)

(58) Field of Classification Search
CPC .......... B60N 2/28; B60N 2/002; B60R 22/48; B60R 2022/4858
See application file for complete search history.

(56) References Cited

U.S. PATENT DOCUMENTS

| | | | |
|---|---|---|---|
| 5,690,356 A | 11/1997 | Lane | |
| 6,419,199 B1 * | 7/2002 | Skofljanec | B60R 21/01556 24/633 |
| 6,522,257 B1 | 2/2003 | Jakob et al. | |
| 6,561,543 B1 | 5/2003 | Hamada et al. | |
| 7,050,897 B2 * | 5/2006 | Breed | E05F 15/431 280/728.1 |
| 7,159,686 B2 | 1/2007 | Martinez et al. | |
| 7,410,214 B2 | 8/2008 | Hayden et al. | |

(Continued)

FOREIGN PATENT DOCUMENTS

| | | |
|---|---|---|
| DE | 19830104 A1 | 1/2000 |
| DE | 19908197 A1 | 1/2000 |

(Continued)

*Primary Examiner* — Philip F Gabler
(74) *Attorney, Agent, or Firm* — Vivacqua Crane PLLC

(57) ABSTRACT

A child restraint seat sensing device for a vehicle including a structural element at least partially defining a volume, wherein the structural element is located in a vehicle passenger seat between a seat base and seat back or is located behind the vehicle passenger seat, a stationary anchor in the vehicle, wherein the stationary anchor is located within the volume defined by the structural element, and a sensor mounted to the structural element, wherein the sensor is configured to detect whether a child restraint seat connector is attached to the stationary anchor.

20 Claims, 9 Drawing Sheets

(56) References Cited

U.S. PATENT DOCUMENTS

| | | |
|---|---|---|
| 7,566,073 B2 | 7/2009 | Shin |
| 8,610,569 B2 | 12/2013 | Lanta |
| 10,065,529 B1 | 9/2018 | Nieto et al. |
| 11,046,286 B2 | 6/2021 | Golm et al. |
| 11,358,499 B2 * | 6/2022 | Thomas .................. B60N 2/28 |
| 2004/0051356 A1 | 3/2004 | Neelis |
| 2004/0080195 A1 | 4/2004 | Adams et al. |
| 2005/0057016 A1 | 3/2005 | Martinez et al. |
| 2005/0184576 A1 | 8/2005 | Gray et al. |
| 2006/0185446 A1 | 8/2006 | Speckhart |
| 2008/0303260 A1 * | 12/2008 | Jaskol .................... B60R 22/48 |
| | | 280/801.1 |
| 2009/0152933 A1 | 6/2009 | Casey |
| 2016/0009249 A1 | 1/2016 | Patalak et al. |
| 2019/0054841 A1 | 2/2019 | Cech et al. |
| 2021/0229626 A1 | 7/2021 | Demirovic et al. |

FOREIGN PATENT DOCUMENTS

| | | |
|---|---|---|
| DE | 60002118 | 3/2004 |
| DE | 102016113981 A1 | 2/2017 |
| DE | 102015222419 A1 | 5/2017 |
| DE | 102017207371 A1 | 11/2018 |
| DE | 112017000786 | 11/2018 |
| DE | 102020124767 A1 | 4/2021 |

\* cited by examiner

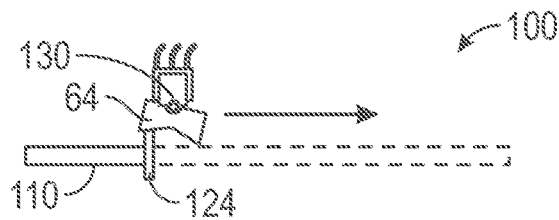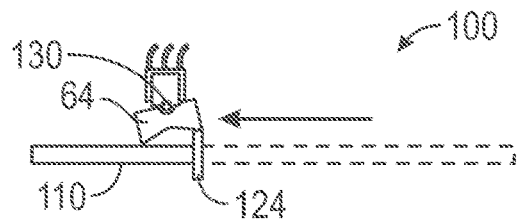
FIG. 10A  FIG. 10B
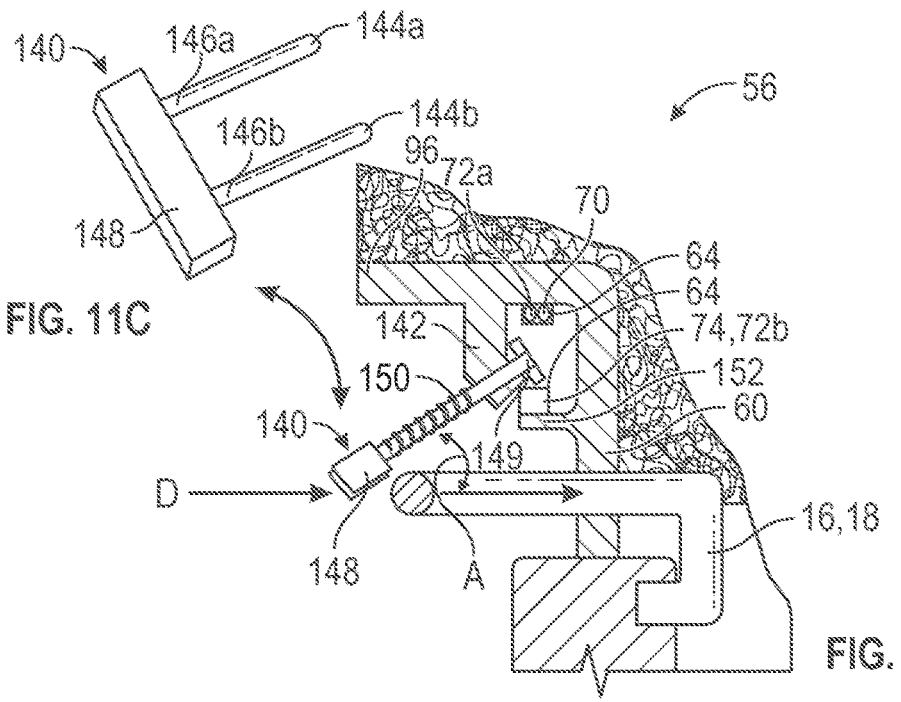
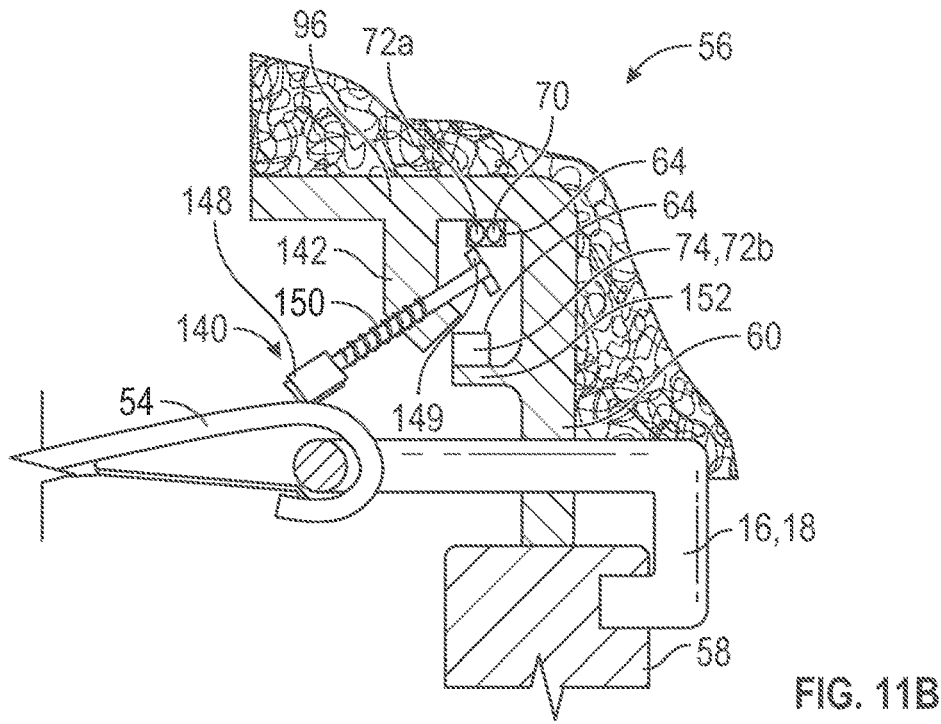
FIG. 11A
FIG. 11B
FIG. 11C

LOWER AND UPPER LATCH ANCHOR USE DETECTION SENSING DEVICE

INTRODUCTION

The present disclosure relates to a lower and upper LATCH anchor use detection sensing device.

Airbags are utilized in vehicles as a safety mechanism to provide cushioning and restraint of occupants in a crash with the intent of reducing occupant injury. Airbags may be provided in various locations within a vehicle, including the instrument panel, headliner, steering wheel, body pillars, etc. However, it has been found that deployment of the airbag generates forces that may be too high for children secured in a child restraint seat or for children below a certain size and weight. Systems were then developed to manually and automatically deactivate airbags associated with a given seat. For example, a weight sensing system may be used to automatically deactivate an airbag by sensing and measuring the weight of an occupant in a given seat. If the weight is less than a threshold, the airbag(s) associated with that seat is deactivated. However, in some situations, the combination of a child and a child restraint seat may result in a weight measurement that is above the threshold for deactivating the airbags associated with that seat. In such a situation, without manual deactivation, the airbag may deploy even though a child is present in the seat.

Thus, there is a need for providing sensing devices for determining child restraint seat LATCH attachment usage in a given seating location in a vehicle.

SUMMARY

According to several aspects, a child restraint seat sensing device for a vehicle includes a structural element at least partially defining a volume, wherein the structural element is located in a vehicle passenger seat between a seat base and seat back or is located behind the vehicle passenger seat, a stationary anchor in the vehicle, wherein the stationary anchor is located within the volume defined by the structural element, and a sensor mounted to the structural element, wherein the sensor is configured to detect whether a child restraint seat connector is attached to the stationary anchor.

In accordance with another aspect of the present disclosure, the sensor includes at least one of an optical sensor, a contact sensor, a proximity sensor, a potentiometer and an encoder.

In accordance with further aspects, the sensor is an optical sensor that includes an emitter, a reflector and a receiver, wherein the emitter and the receiver are coupled to a first portion of the structural element and the reflector is coupled to a second portion of the structural element opposing the first portion, and wherein when the child restraint seat connector is attached to the stationary anchor the child restraint seat connector passes between the emitter and the reflector.

In accordance with further aspects, the sensor is an optical sensor that includes an emitter and a receiver, wherein the emitter is coupled to a first portion of the structural element and the receiver is coupled to a second portion of the structural element opposing the first portion, and wherein the child restraint seat connector is attached to the stationary anchor, the child restraint seat connector passes between the emitter and the receiver.

In accordance with additional aspects of the present disclosure, the sensor is configured to indicate a first output when the child restraint seat connector is attached to the stationary anchor and indicate at least one of a second output and a third output when the child restraint seat connector is not attached to the stationary anchor wherein the second output is different from the first output and the third output is between the first output and the second output.

In accordance with additional aspects of the present disclosure, the sensor is configured to indicate no output when the sensor malfunctions.

In accordance with additional aspects of the present disclosure, the sensor is configured to indicate a first output when the child restraint seat connector is not attached to the stationary anchor and is configured to indicate at least one of a second output and a third output, when the connector is attached to the stationary anchor, wherein the second output is different from the first output and the third output is between the first output and the second output.

In accordance with additional aspect of the present disclosure, the sensor is fore of the stationary anchor relative to an opening defined in the structural element for receiving the child restraint seat connector.

In accordance with additional aspects of the present disclosure, the sensor is aft of the stationary anchor relative to an opening for receiving the child restraint seat connector defined in the structural element.

In accordance with further aspects, the child restraint seat sensing device further includes a guide extends from the structural element aft of the stationary anchor and a spring, wherein the spring includes a proximal end and a distal end, the proximal end is mounted at the opening, the distal end is configured to slide between the structural element and the guide, and the spring includes a bend fore of the stationary anchor.

In accordance with additional aspects, the child restraint seat sensing device further includes a second sensor and a portion of the spring includes a reduced area, wherein the reduced area is at least partially aligned with the second sensor when the distal end of the spring slides between the structural element and the guide.

In accordance with further aspects, the child restraint seat sensing device further includes a support arm extending from the structural element, a biased pushrod mounted in the support arm, and a spring, wherein the spring includes a proximal end and a distal end, the proximal end is mounted at the opening, the spring includes a bend aft of the stationary anchor, and the biased pushrod is configured to contact the spring when the child restraint seat connector is attached to the stationary anchor.

In accordance with further aspects, the child restraint seat sensing device further includes a spring loaded push button mounted at an angle in a support arm extending from a surface of the structural element, wherein the angle is relative to a direction of insertion of the child restraint seat connector.

In accordance with additional aspects of the present disclosure, the child restraint seat sensing device further includes a spring biased door mounted in the opening defined by the structural element, wherein the spring biased door covers the opening when in a closed position.

In additional aspects of the present disclosure, the child restraint seat sensing device further includes a second sensor including one portion of the sensor mounted on the spring biased door and another portion of the sensor mounted on a support arm extending from the structural element.

In additional aspects of the present disclosure, the child restraint seat sensing device further includes a swing arm mounted at the opening, wherein the sensor is a proximity sensor and the swing arm is configured to swing towards the proximity sensor when the child restraint seat connector is inserted into the opening.

In accordance with additional aspects, the child restrain seat further includes a movable element including a smaller portion, wherein the movable element is movable by the connector and the sensor is configured to sense the smaller portion of the movable element when the connector is not attached to the stationary anchor and the sensor is configure to sense a remainder of the movable element when the connector is attached to the stationary anchor.

In additional aspects of the present disclosure, the child restraint seating sensing device further includes one or more pressure sensors positioned within the vehicle passenger seat.

According to several aspects, a child restraint seat system for a vehicle includes a passenger seat including a seat base and a seat back; at least two stationary lower anchors located between the seat base and the seat back, and at least one tether anchor located behind the seat back. The child restraint seat system further includes a structural element for each of the stationary lower anchors and the tether anchor, wherein each structural element defines a volume and one of the anchors is located within the volume. In addition, a sensor is mounted to each structural element, wherein each sensor is configured to detect whether a child restraint seat connector is attached to the anchor associated with the structural element. The child restraint seat system also includes a processor coupled to the sensor.

In accordance with another aspect of the present disclosure, a pressure sensor is located in at least one of the seat base and the seat back, wherein the pressure sensor is also coupled to said processor Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 10A illustrates another aspect of a sensor used in the sensing device illustrated in FIG. 9A, wherein the sensor is a rocker switch;

FIG. 10B illustrates the rocker switch of FIG. 10A repositioned due to the insertion of a connector;

FIG. 11A illustrates another aspect of a sensing device, including a spring loaded push button;

FIG. 11B illustrates the configuration of the sensing device of FIG. 11A upon the insertion of a connector;

FIG. 11C illustrates the configuration of a spring loaded push button;

DETAILED DESCRIPTION

The following description is merely exemplary in nature and is not intended to limit the present disclosure, application, or uses.

Figure 1:
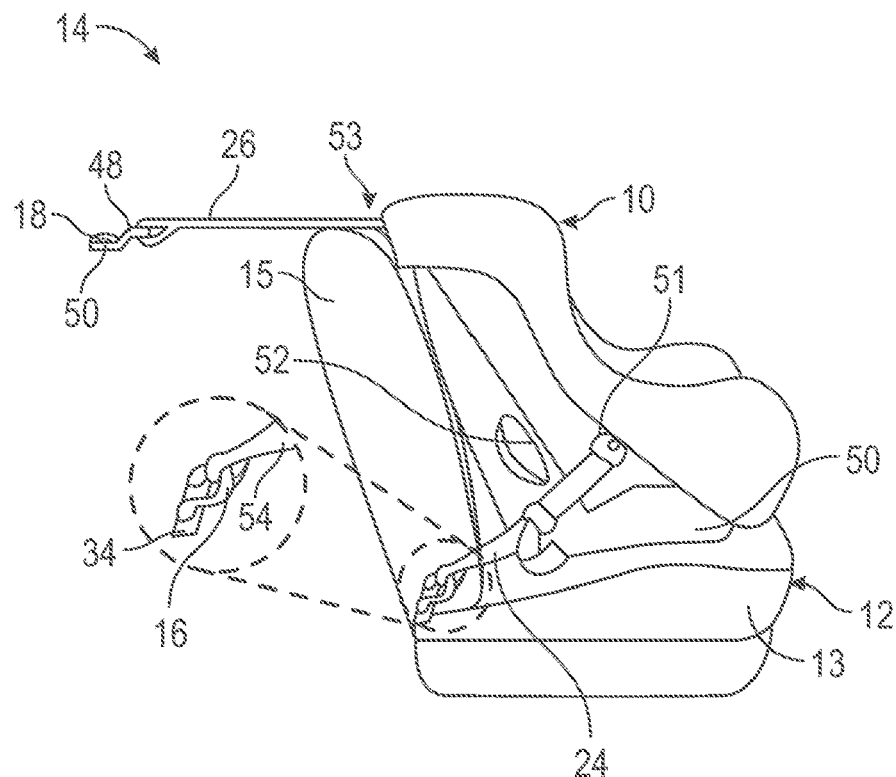
FIG. 1 is an illustration of a child restraint seat positioned on a passenger seat in a vehicle in the forward facing position.

The present disclosure relates to a lower and upper LATCH anchor use detection sensing device. Lower anchors and tethers for children (LATCH) and otherwise known as e.g., ISOFIX or the Universal Child Safety Seat System (UCSSS), is an international system for providing attachment points for securing child restraint seats in a vehicle. LATCH systems provide an alternative to anchoring child restraint seats using seatbelts. FIG. 1 illustrates a child restraint seat 10 anchored to a passenger seat 12 within a vehicle 14 using the LATCH system. The child restraint seat 10 rests on the seat base 13 and against the seat back 15. The LATCH system illustrated in FIG. 1 includes two lower anchors 16a, 16b (only one lower anchor 16 is visible in FIG. 1) and a tether anchor 18 (the lower and tether anchors collectively referred to herein as anchors 16, 18) associated with each passenger seat 12. In addition, the child restraint seat 10 includes straps 24 and a tether 26 for coupling the child restraint seat 10 to the passenger seat 12.

Figure 2:
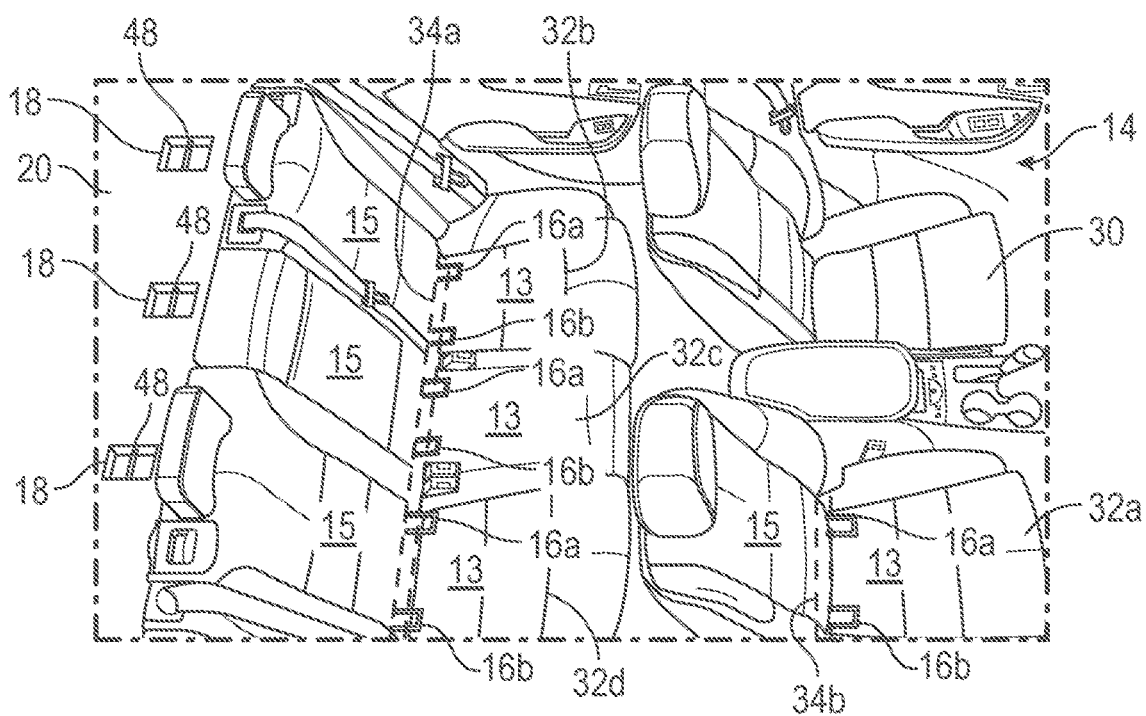
FIG. 2 is an illustration of passenger seats present in a vehicle interior.

FIG. 2 illustrates an arrangement of LATCH anchors in a vehicle 14. The vehicle 14 includes a front driver seat 30, a front passenger seat 32a and rear passenger seats 32b, 32c, 32d (the passenger seats being collectively referred to as passenger seats 32). It may be appreciated that in some autonomous vehicles a driver seat 30 may not be present, just passenger seats 32. In the illustrated aspect, a set of lower anchors 16a, 16b (collectively referred to herein as lower anchors 16) is provided in each passenger seat 32, including in one or more rear passenger seat 32b, 32c, 32d and optionally in the front passenger seat 32a.

In addition, in aspects, a tether anchor 18 is associated with each set of lower anchors 16 in the rear passenger seats 32b, 32c, 32d and optionally associated with the front passenger seat 32a as well. Each tether anchor 18 is positioned behind the rear passenger seats 32b, 32c, 32d on the rear deck 20. However, the tether anchors 18 may alternatively, or additionally, be positioned at the vehicle roof, at the back of a seat, on a vehicle structure behind the seat or at the vehicle floor depending, e.g., on the design of the vehicle frame and vehicle seats, and the seating arrangement. It is noted that if lower anchors 16 are present in the front passenger seat 32a, the tether anchor 18 may be located in the rear of the front passenger seat 32a (and is therefore not visible in the present illustration).

Figure 3:
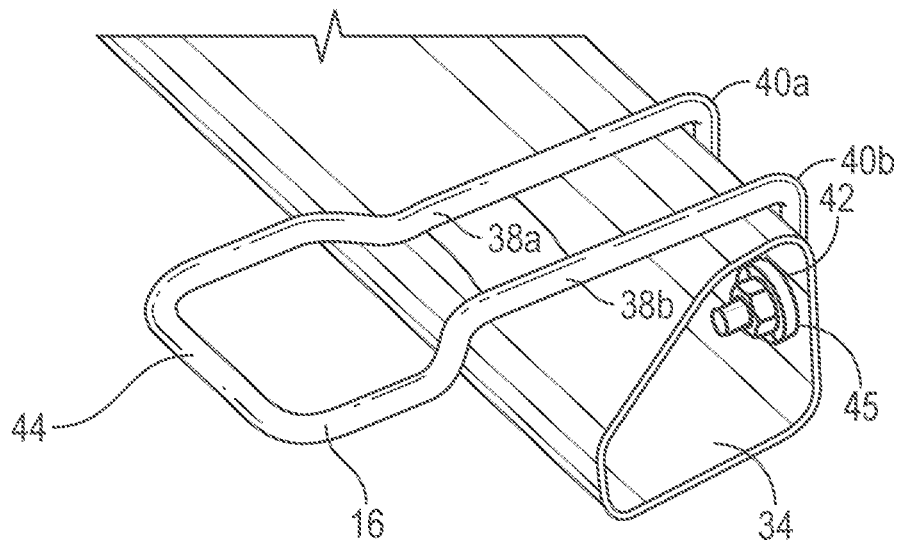
FIG. 3 is an illustration of an aspect of an anchor connected to a cross member.

With continued reference to FIG. 2, the lower anchors 16 are connected either directly or indirectly to the vehicle frame such as by a cross member 34a located under the rear passenger seats 32b, 32c, 32d or integrated into the passenger seats 32 such as cross bar 34b integrated into the front passenger seat 32a or in captain style chairs that may be located behind the front passenger seat 32a (cross members 34a and cross bars 34b are collectively referred to as cross members 34). FIG. 3 illustrates an aspect of a lower anchor 16 extending from a cross member 34 that is integrated into a passenger seat 32.

As shown in FIG. 3, the lower anchor 16 includes two legs 38a 38b, which form "j" shaped hooks 40a, 40b that extend from either side of the lower anchor 16. The hooks 40a, 40b are inserted into openings 42 (only one opening is illustrated) in the cross member 34. In the illustrated aspect, opposing the "j" hooks 40a, 40b is a loop 44, which is accessible to passengers and to which the child restraint seat 10 is coupled to. As illustrated, the legs 38a, 38b are welded, or otherwise fastened together between the "j" hooks 40a, 40b and the loop 44. In additional aspects, the lower anchor 16 is welded, or otherwise fastened by a mechanical fastener 45, to the cross member 34. The lower anchors 16 are stationary and do not pivot or rotate relative to the cross member 34.

Referring again to FIG. 2, the tether anchors 18 include a bar 48 that is affixed into the support structure of the rear deck 20 (see also the inset of FIG. 1, which illustrates a bar 48 coupled to a support frame 50 that supports the rear deck 20). If the tether anchor 18 is integrated into the seat back (not illustrated), the tether anchor 18 may be coupled to a cross member 34 that supports the passenger seat 32 and similarly if the tether anchor 18 is integrated into the floor or roof, the tether anchor 18 may be coupled to a structural member in the frame.

With reference again to FIG. 1, an aspect of a child restraint seat 10 is illustrated. The child restraint seat 10 includes a support frame 50. In the illustrated aspect, a lower strap 24 is affixed to each side 51 of the support frame 50. It may be appreciated that, in alternative aspects, a single lower strap 24 may be present, and passed through the belt path route 52.

Lower strap 24 couples to the lower anchor 16 to retain the child restraint seat 10 in the passenger seat 12 (see also passenger seat 32 in FIG. 2). In addition, a tether 26 connects the upper portion 53 of the support frame 50 and child restraint seat 10 to the tether anchor 18, providing stability and preventing the child restraint seat 10 from tipping forward. While the child restraint seat 10 is illustrated in the forward facing position, the child restraint seat 10 may also be placed in the rear facing position. Depending on the size, weight, and positioning of the child restraint seat, either both of the tether anchor 18 and lower anchors 16 may be used or just the lower anchors 16 may be used. As noted above, it may further be appreciated that when a seat belt (not illustrated) is used to attach a child restraint seat 10, in addition or alternatively to the lower straps 24, the tether 26 may also be used to attach the child restraint seat 10 to prevent tipping of the child restraint seat 10 forward.

Figure 4A:
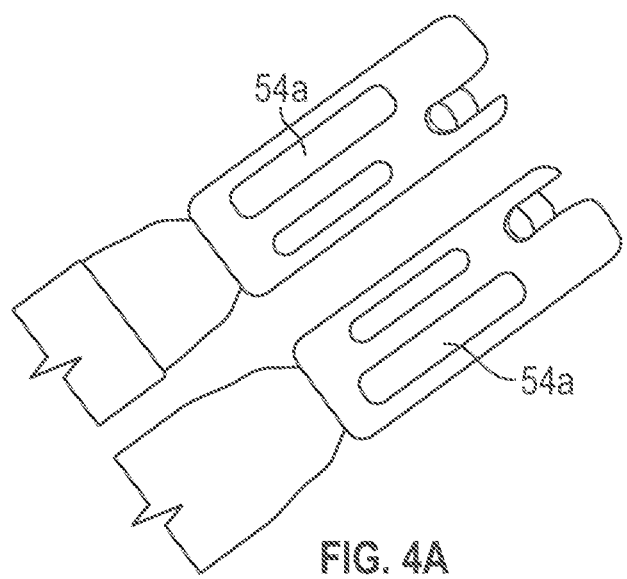
FIG. 4A illustrates an aspect of a strap or tether connector for a lower anchor or a tether anchor.
Figure 4B:
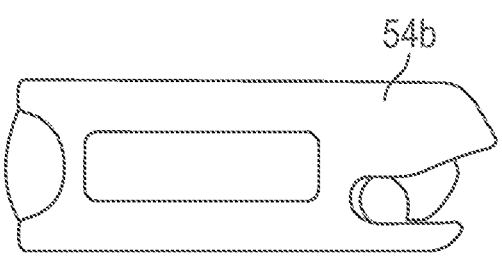
FIG. 4B illustrates another aspect of a strap or tether connector for a lower anchor or a tether anchor.
Figure 4C:
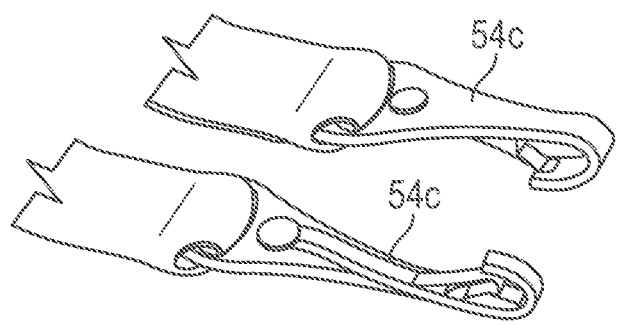
FIG. 4C illustrates yet another aspect of a strap or tether connector for a lower anchor or a tether anchor.

FIGS. 4A, 4B and 4C illustrate various configurations of child restraint seat connectors 54a, 54b, 54c (collectively referred to herein as child restraint seat connectors 54) used to connect the lower strap 24 or tether 26 to the anchors 16, 18. In some aspects, lower strap 24 is coupled to the lower anchors 16 using child restraint seat connector 54a or 54b and tether 26 is coupled to the tether anchor 18 using child restraint seat connector 54c. If a single lower strap 24 is provided, the lower strap 24 is affixed at either end of the lower strap 24 by child restraint seat connectors 54. If multiple lower straps 24 are provided, each lower strap 24 is affixed at one end to a child restraint seat connector 54 and at the other end to a side of the child restraint seat 10. In aspects, the child restraint seat connectors 54 are the same for both the lower anchors 16a, 16b and the upper, tether anchors 18. In alternative aspects, the child restraint seat connectors 54 are the same for both the lower anchors 16a, 16b and the child restraint seat connector 54 for the upper, tether anchor 18 is different from the lower anchor 16 connectors 54. And, in further alternative aspects, the child restraint seat connectors 54 are different for each lower anchor 16a, 16b and the upper, tether anchor 18.

Figure 5:
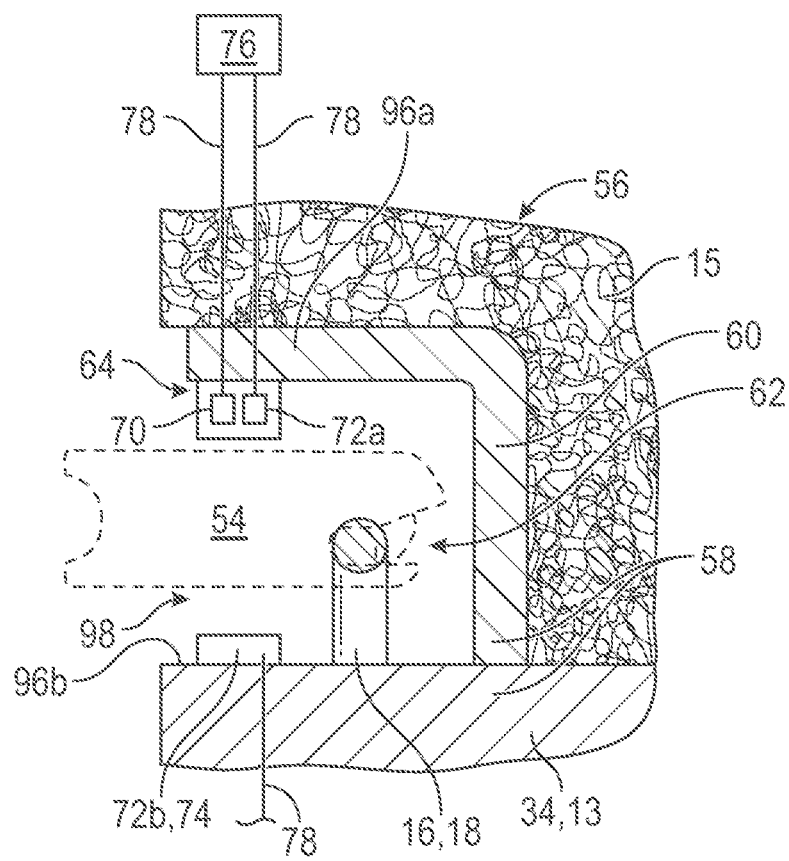
FIG. 5 illustrates an aspect of a sensing device.

To detect the attachment of a child restraint seat 10 to the LATCH system lower anchors 16 and tether anchor 18 in a passenger seat 12, 32 by way of child restraint seat connectors 54, a sensing device 56 is incorporated into the structural elements 58 (or bezels 60) adjacent to at least one lower anchor 16 or tether anchor 18 associated with a given passenger seat 12, 32. An aspect of a sensing device 56 is illustrated in FIG. 5, which includes structural elements 58 and one or more sensor(s) 64 mounted to the structural element 58. In the illustrated aspect, the structural element 58 is in the form of a bezel 60 coupled to a cross member 34, or seat base 13, and located between the seat base 13 and the seat back 15. The structural element 58 defines at least a portion of the volume 62 in which each lower anchor 16 or tether anchor 18 is received. For example, as illustrated in FIG. 5, the structural elements 58 include the bezel 60 and the cross member 34, which define a volume 62. A lower anchor 16 is present being present in the volume 62. With regard to tether anchor 18, the bezel 60 is positioned in the rear deck 20, or at other locations behind a passenger seat 32 as noted, and the bezel 60 defines a volume surrounding the tether anchor 18. As alluded to above, the volume 62 may also be defined by alternative or additional structural elements 58 to the bezel 60 such as the cross member 34, the seat back 15, the seat base 13, vehicle structure, seat structure, seat cushion, seat trim, or the rear deck 20.

Figure 6A:
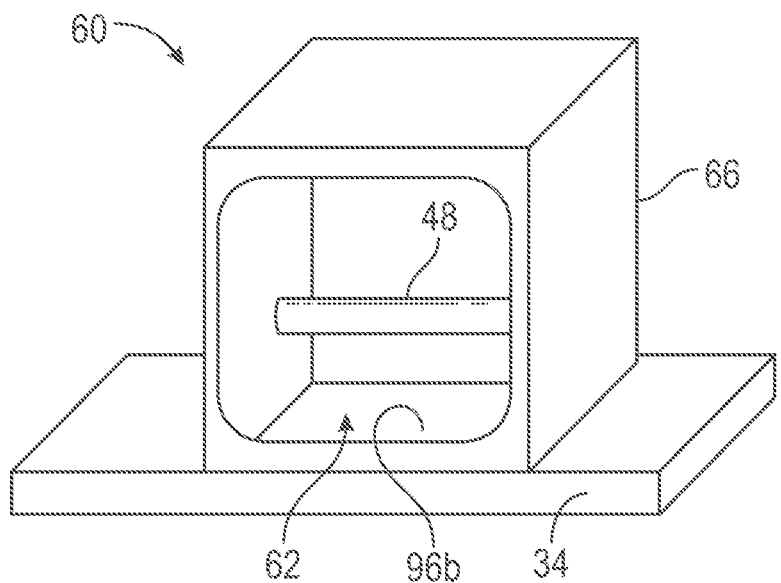
FIG. 6A illustrates an aspect of a bezel.
Figure 6B:
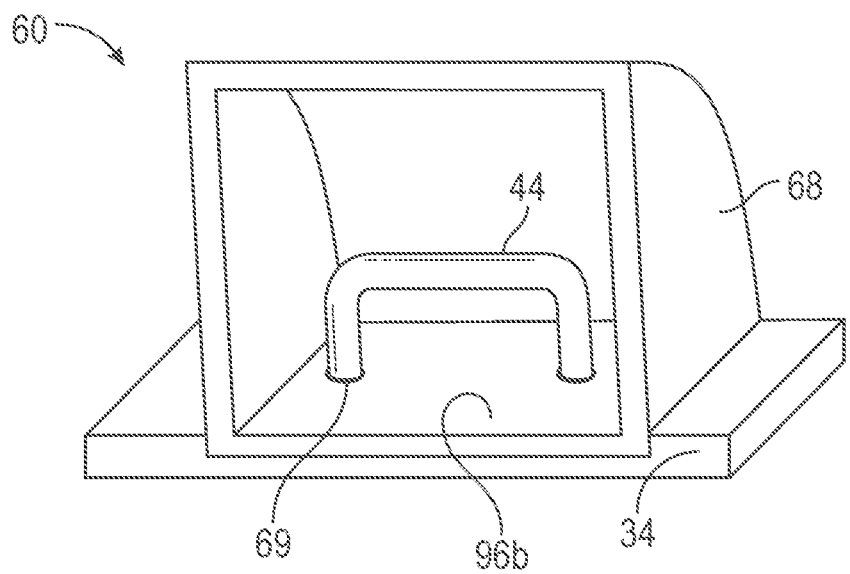
FIG. 6B illustrates another aspect of a bezel.

FIGS. 6A and 6B illustrate two aspects of bezels 60. In FIG. 6A, the bezel 60 is in the general shape of a five (5) sided box 66, which defines a volume 62 therein. In aspects, the box 66 is coupled to a cross member 34 or a rear deck 20. As illustrated, the bar 48 of the tether anchor 18 is located within the volume 62. Alternatively, a loop 44 of a lower anchor 16 may be located within the volume 62.

In the aspect illustrated in FIG. 6B, the bezel 60 assumes an arcuate shape 68 with a volume 62 defined between the arcuate shape 68 and a cross member 34. Each leg 38a, 38b passes through a hole 69 in the second portion, or base, 96b of the bezel 60, such that the loop 44 is located within the volume 62 of the bezel 60. Alternatively, the bar 48 of a tether anchor 18 may be located within the volume 62. In aspects, the bezel 60 is formed from a polymeric material, such as polyamide, polyethylene, polypropylene, polyester, acrylonitrile butadiene styrene, polystyrene, polyoxymethylene, polycarbonate, co-polymers, blends or combinations thereof.

Referring again to FIG. 5, a child restraint seat connector 54 is inserted to the volume 62 and coupled to the lower anchor 16 or tether anchor 18 during use. As illustrated, a sensor 64 (or at least a portion of a sensor 64) is coupled to the bezel 60, or other structural element 58, in a location where it is directly or indirectly triggered, i.e., indicates the attachment of the child restraint seat connector 54, by the insertion of a child restraint seat connector 54 into the volume 62 and attachment of the child restraint seat connector 54 to the lower anchor 16 or tether anchor 18. The bezel 60 holds the sensor 64 in place fore of the lower anchor 16 or tether anchor 18 relative to an opening 98 defined by the bezel 60. However, it may be appreciated that in aspects, such as those described further herein, the sensor 64 is held in place aft of the lower anchor 16 or tether anchor 18 or in line with the lower anchor 16 or tether anchor 18 relative to the opening 98.

In aspects, the sensor 64 is an optical sensor, which includes an emitter 70 and a detector 72a, 72b (collectively referred to herein as detector 72), configured to detect electromagnetic ultraviolet radiation, visible radiation, infrared radiation or a combination thereof. The emitter 70 is mounted to a first portion 96a, i.e. a first side, of the bezel 60 and emits electromagnetic radiation or other signals of a given wavelength, in the range of 0.1 to 100 microns, including all values and ranges therein such as 0.7 microns to 10 microns. The emitter 70 includes, in aspects, a light emitting diode, a laser, or an incandescent light source. In other aspects, the emitter 70 emits radio frequencies in the range of 0.1 to 10 meters, including all values and ranges therein. In aspects, the electromagnetic radiation or other signal is reflected by the child restraint seat connector 54 and then detected by the detector 72a. Alternatively, a detector 72b is positioned at, or extending from a second portion 96b, or second side, of the bezel 60 opposing the emitter 70 and the blocking of electromagnetic radiation or other signal by the child restraint seat connector 54 is detected. In yet another alternative aspect, a reflector 74 is located at a second portion 96b of the bezel 60 opposing the emitter 70, reflecting emitted electromagnetic radiation emitted by the emitter 70, which is then detected by the detector 72a. Depending on the amount of electromagnetic radiation or other signal detected by the detector 72a, 72b (collectively referred to herein as 72), a signal of a given voltage is transmitted to a processor 76 coupled to the sensor 64 by, e.g., an electrically conductive wire 78 or by radio frequency using a transmitter located at the sensor 64 and a receiver coupled to the processor 76. In aspects, the detector 72 includes a photodetector, such as a charge-coupled device, which is configured to detect electromagnetic radiation or other signal emitted by the emitter 70. In further aspects, the sensor 64 includes only a charge-coupled device configured to detect changes in ambient electromagnetic radiation (i.e., electromagnetic radiation emitted by the sun, other sources within the vehicle, such as infrared light sources, visible light sources, etc.) when a child restraint seat connector 54 is inserted into the volume 62 and, in further aspects, coupled to the lower anchor 16.

In a further aspect, alternative or additional to the aspect noted above, the sensor 64 is a contact sensor, such as a strain gauge, pressure sensor, mechanical switch or a piezoelectric sensor, wherein the child restraint seat connector 54 directly or indirectly contacts the sensor 64 to indicate that the child restraint seat connector 54 has been inserted into the volume 62 and, in further aspects, coupled to the lower anchor 16. In yet a further aspect, alternative to or additional to the aspects noted above, the sensor 64 is a proximity sensor, such as an inductive proximity sensor, a hall effect sensor, a capacitive sensor, an eddy current sensor or a magnetic sensor that can detect the presence of detectible material in the child restraint seat connector 54.

It may be appreciated that sensor 64, as well as any of the other sensors 65, 83, 86, etc. described herein, are analog or digital sensors, configured to provide an output, such as a change in resistance, a change in voltage, or other signals representative of the information or conditions detected by the sensor. In aspects, failure of a sensor 64, 65, 83, 86, etc., to provide an output may indicate an improperly functioning state of the sensor 64, 65, 83, 86, etc. In further aspects, the sensor 64, 65, 83, 86, etc., may include amplifiers, analog to digital convertors or other signal processing components, or signal processing components may be separately included or included on the processor 76.

Figure 7:
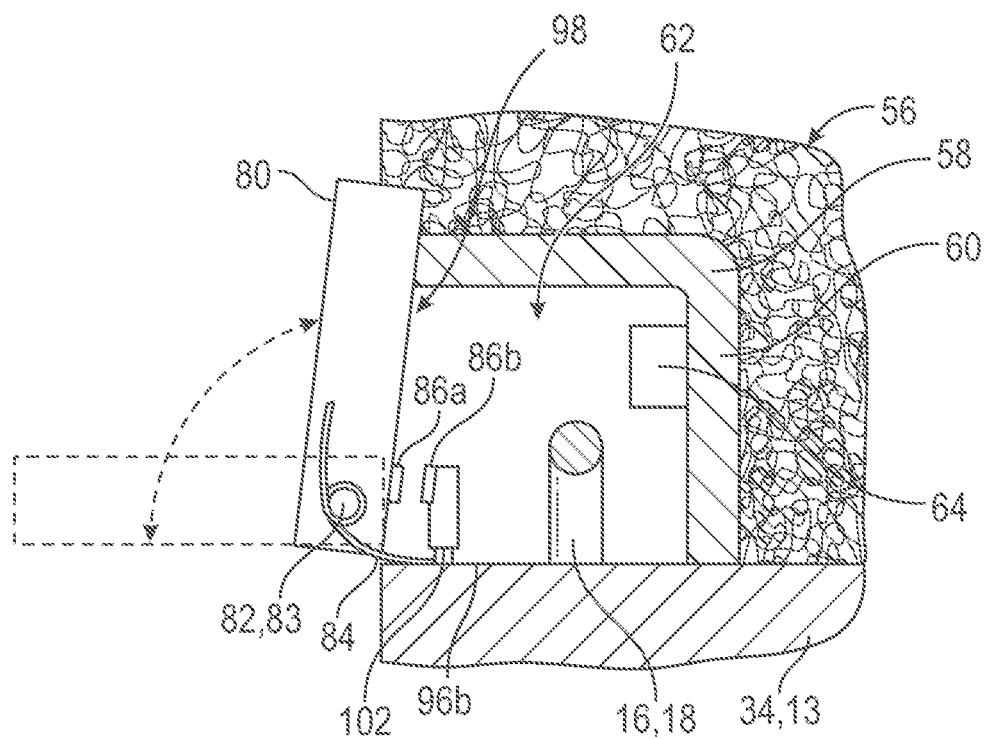
FIG. 7 illustrates another aspect of a sensing device including a door.

FIG. 7 illustrates an aspect of a sensing device 56 that includes a door 80 coupled to a structural element 58. As illustrated, the door 80 rotates around a pivot 82, which is coupled to a second portion 96b of the bezel 60 or the cross member 34. In aspects, the door 80 is biased with a spring 84, which maintains the door 80 in a normally shut position, closing the volume 62 and opening 98 defined by the structural elements 58. In addition to, or alternatively to, the sensor 64 described in FIG. 5 above, a second sensor 86 is located proximal to the door 80. As illustrated, a first portion of the second sensor 86a is attached to a support arm 102, which is attached to the cross member 34 or second portion 96b of the bezel 60 and the second portion of the second sensor 86b is attached to the door 80. At least one of the sensors 64, 86 is configured to indicate whether the door 80 is in the closed position (as illustrated in solid line) or open position (as illustrated in dotted line), allowing access to the volume 62 by detecting one of the presence or proximity of the door 80, the presence or proximity of a first portion of a second sensor 86a, the presence or proximity of a second portion of a second sensor 86b, or changes to ambient light, i.e., light that is present in the volume 62. The sensors 64, 86 include at least one of the contact, optical and proximity sensors enumerated above. As yet another option, a sensor 83 in the form of a rotary potentiometer or encoder can be attached to the pivot 82 to detect door 80 rotation.

Figure 8A:
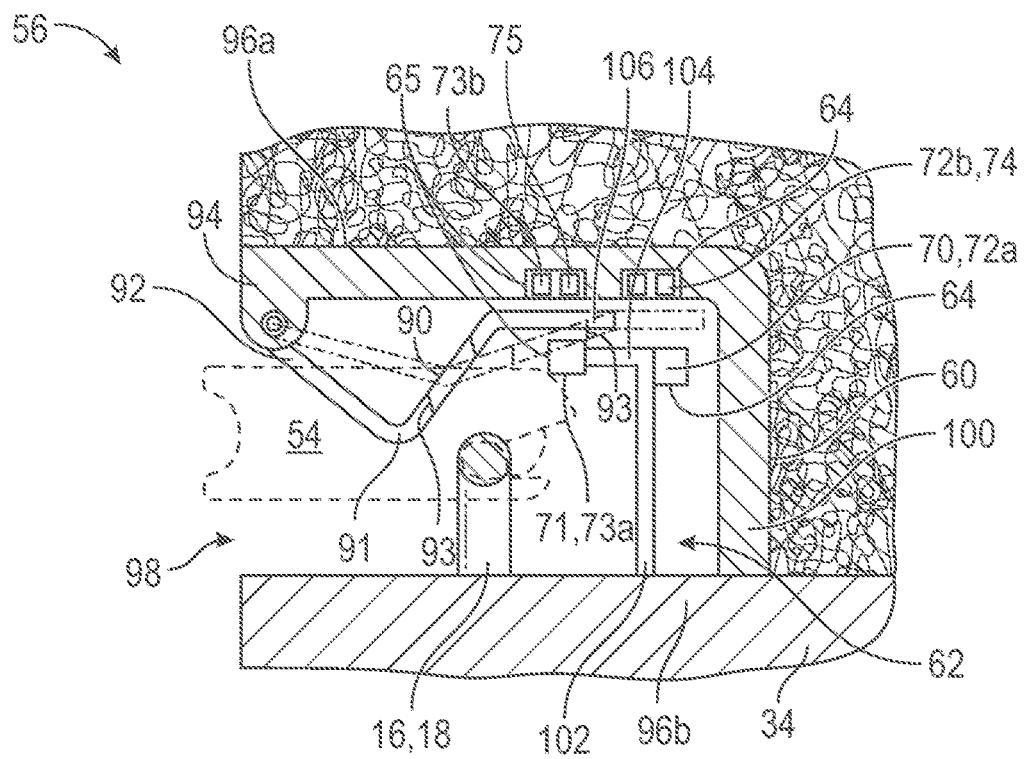
FIG. 8A illustrates an aspect of a sensing device including a spring.
Figure 8B:
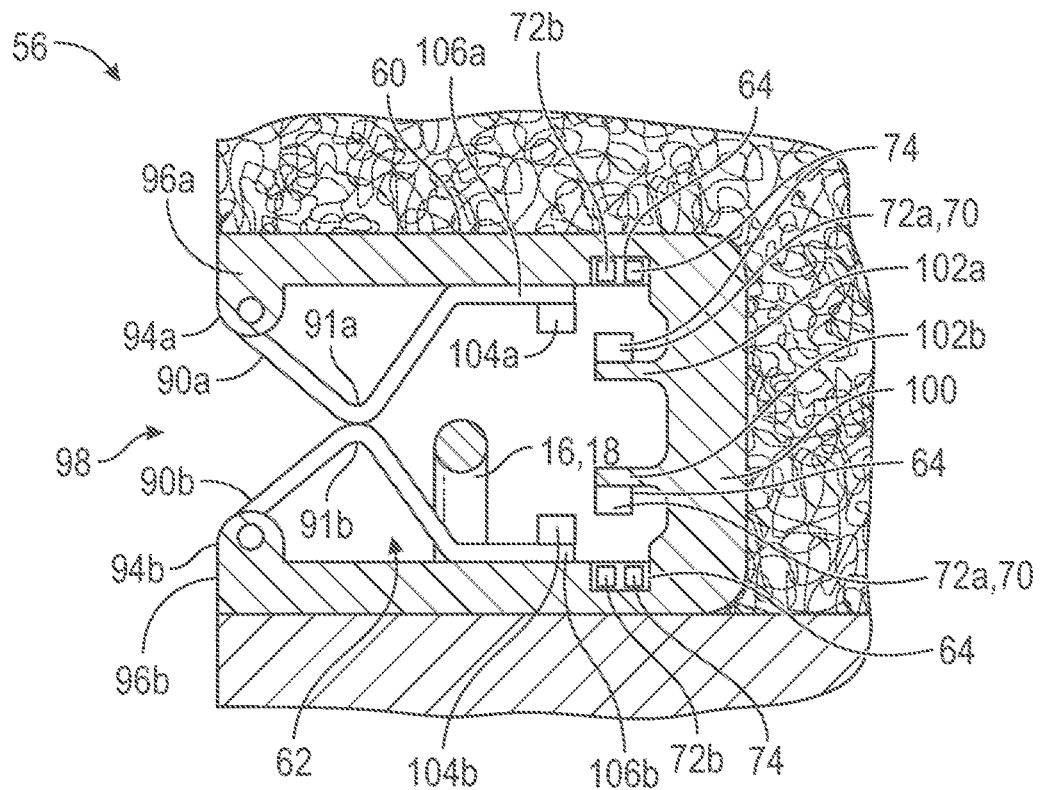
FIG. 8B illustrates another aspect of a sensing device including two springs.

FIGS. 8A and 8B illustrate another aspect of the present disclosure wherein the sensing device 56 includes one or more springs 90, 90a, 90b or mechanical linkages to trigger a sensor 64 either by contact, optically by altering electromechanical radiation detected by the sensor 64, or proximally altering an electromagnetic field. In the case of a spring 90, the spring 90 includes a bend 91 fore of the lower anchor 16 or tether anchor 18 relative to the bezel 60 opening 98. In the illustrated aspect of FIG. 8A, the proximal end 92 of the spring 90 is connected to a lip 94 formed from the bezel 60 at the upper surface or first portion 96a of an opening 98 defined by the bezel 60. As a child restraint seat connector 54 is inserted into the volume 62, the child restraint seat connector 54 contacts the spring 90 and pushes the spring 90 upward and towards the rear 100 of the bezel 60. Also in the illustrated aspect, a portion of the sensor 64 is mounted to a first portion 96a of the bezel 60 and another portion of the sensor 64 mounted to a support arm 102, which is connected to a second portion 96b of the structure element 58, i.e., either the cross member 34 or the bezel 60. The support arm 102 includes a guide 104 that, with the bezel 60, guides the distal end 106 of the spring 90 towards the sensor 64. The distal end 106 of the spring 90 slides between the guide 104 and the first portion 96a of the bezel 60 located over the guide 104, triggering the sensor 64 when the child restraint seat connector 54 is attached to the lower anchor 16 or tether anchor 18.

In aspects, the sensor 64 includes an emitter 70 and a detector 72a, which are both present on the support arm 102. In alternative aspects, the sensor 64 includes a detector 72b coupled to the bezel 60. In further alternative aspects, the sensor 64 includes an emitter 70 located at the support arm 102, a reflector 74 opposing the emitter 70 mounted to the bezel 60, and a detector 72a positioned adjacent to the emitter 70 on the support arm 102. It may further be appreciated that the arrangement of the sensor 64 components, i.e., emitter 70, the detector 72a, 72b and the reflector 74 (if present) may be inverted, such that the emitter 70 is coupled to the bezel 60 and the detector 72b or reflector 74 is connected to the support arm 102. And, in yet further alternative aspects, only a detector 72 may be present to form the sensor 64. Sensors 64 include those enumerated above.

In the aspect illustrated in FIG. 8B, two springs 90a, 90b are provided, wherein each spring 90a, 90b, is coupled to a lip 94a, 94b formed from the bezel 60 at opposing first and second portions 96a, 96b at the opening 98 defined by the bezel 60. Both springs 90a, 90b include a bend 91a, 91b. Again, as the child restraint seat connector 54 is inserted into the volume 62 defined by the bezel 60, the springs 90a, 90b are pushed towards the rear 100 of the bezel 60. At least one sensor 64 is included for each spring 90a, 90b. As the springs 90a, 90b slide towards the rear 100 of the bezel 60, the springs 90a, 90b trigger the sensors 64. In the illustrated aspect, at least one guide 104a, 104b is provided to guide each spring 90a, 90b towards the rear 100 of the bezel 60. In the illustrated aspects, the emitters 70, 70 and optionally detectors 72a, are held by support arms 102a, 102b, which extend from the rear 100 of the bezel 60. In aspects, the emitters 70 are mounted such that they emit away from each other, which may prevent cross detection of the emitted energy by the detectors 72b. Further, in the opposing surfaces or portions 96a, 96b of the bezel 60, detectors 72b or reflectors 74 are positioned. Various configurations and types of sensors 64 may be utilized including those enumerated above.

Figure 9A:
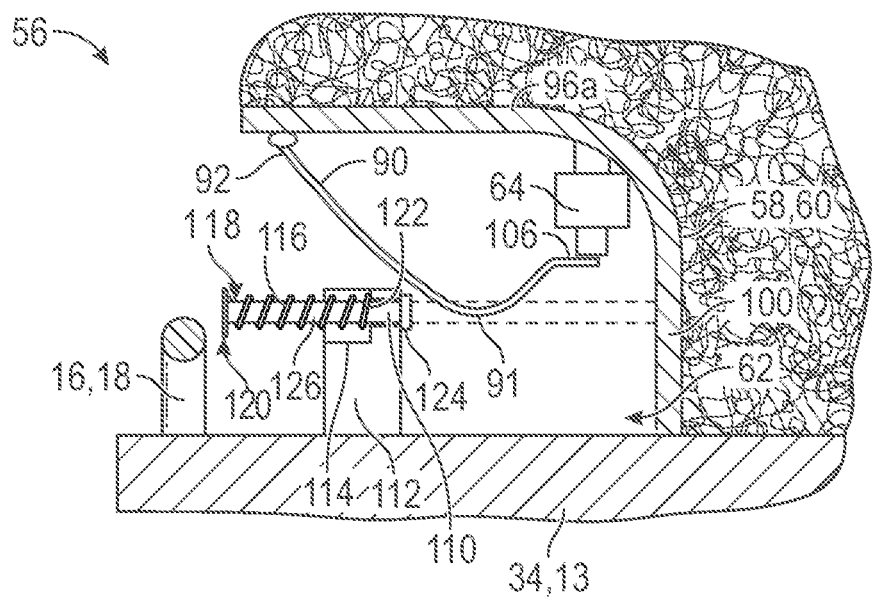
FIG. 9A illustrates an aspect of a sensing device including a biased pushrod.
Figure 9B:
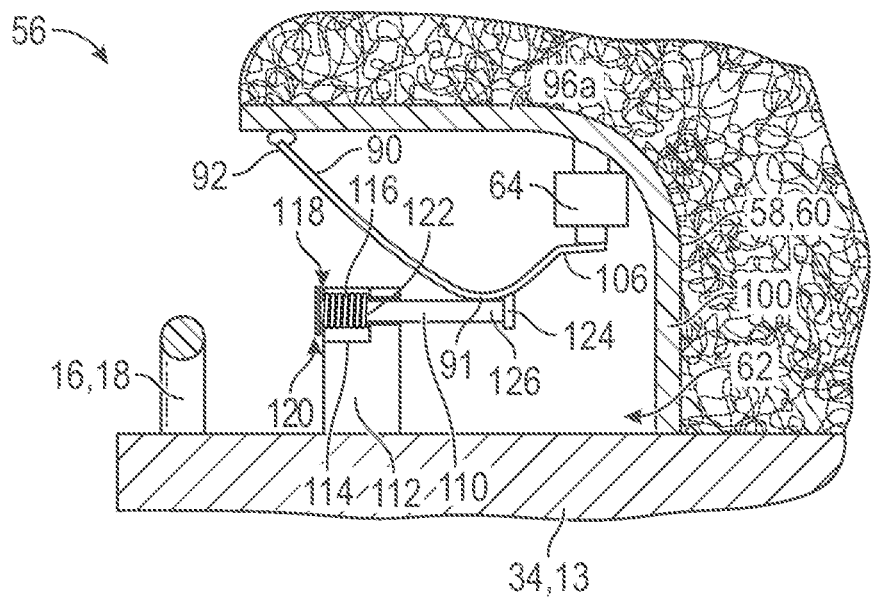
FIG. 9B illustrates the sensing device of 9A wherein the biased pushrod is under load.
Figures 9C, 9D:
FIG. 9C illustrates a cross-sectional configuration of the pushrod.
FIG. 9D illustrates another cross-sectional configuration of the pushrod.

FIGS. 9A and 9B illustrate yet a further aspect of a sensing device 56. In this aspect, a biased pushrod 110 is used to activate the sensor 64 mounted to an upper surface, or first portion 96a of the bezel 60. A spring 90 is mounted at a proximal end 92 to the upper surface or first portion 96a near an opening 98 defined by the bezel 60. The spring 90 includes a bend 91 aft of the lower anchor 16 or tether anchor 18. Pushing the child restraint seat connector 54 into the volume 62 pushes the biased pushrod 110 towards the rear of the bezel 60, which in turn pushes the spring 90 upwards towards the first portion 96a. The distal end 106 of the spring 90 contacts the sensor 64, which includes, e.g., a push button sensor or a proximity sensor. As illustrated, the pushrod 110 is held in place by a support 112, which defines a bore 114 for receiving the pushrod 110. A second spring 116 is used to bias and retract the pushrod 110 when the child restraint seat connector 54 is removed as seen in FIG. 9A. The second spring 116 also is received in the bore 114, wherein a first end 118 of the second spring 116 is connected to a first end 120 of the pushrod 110 and a second end 122 of the second spring 116 is connected to the support 112. As illustrated, each end 120, 124 of the pushrod 110 exhibits a diameter greater than the elongated body 126 of the pushrod 110 between the pushrod ends 120, 124. Movement of the pushrod 110 towards the rear 100 of the bezel 60 places the second spring 116 under a load. FIGS. 9C and 9D illustrate cross-sectional configurations of the pushrod 110. In FIG. 9C, the pushrod 110 is circular in cross-section and in FIG. 9A the cross-section of the pushrod 110 is an intersected circle producing a flat surface 108 upon which the spring 90 (see FIGS. 9A and 9B) may ride. It may be appreciated, however, that alternative pushrod 110 configurations may be selected.

FIGS. 10A and 10B illustrate another aspect of a sensor 64 for use in the sensing device 56 of FIGS. 9A and 9B. In this aspect, a rocker switch is provided as a sensor 64. The end of the pushrod 110 flips the sensor 64 rocker switch. The sensor 64 rocker switch moves or rotates around a pivot 130 as the pushrod 110 slides past it. It may be appreciated, however, that the second end 124 of the pushrod 110 must extend past the sensor 64 rocker switch when the connector 54 is inserted into the volume as illustrated in FIG. 9B, FIG. 10A and FIG. 10B.

FIGS. 11A and 11B illustrate yet a further aspect of the present disclosure, wherein a spring loaded push button 140 is used to trigger a sensor 64. In this aspect, the spring loaded push button 140 is mounted in the bezel 60 at an angle A by a support arm 142 that extends down from the upper surface, or first portion, 96a of the bezel 60, wherein angle A is relative to the direction D of insertion of the child restraint seat connector 54. As illustrated in FIG. 11C, the spring loaded push button 140 includes two elongated arms 144a, 144b connected at a proximal end 146a, 146b by a block 148. The spring loaded push button 140 is mounted into the support arm 142 wherein a spring 150 is positioned around each elongated arm 144a, 144b. When the spring loaded push button 140 is forced by a child restraint seat connector 54 into the rear 100 of the bezel 60, the spring loaded push button 140 travels upward through the support arm 142 and towards the sensor 64. Further the springs 150 are biased and released upon removal of the child restraint seat connector 54. Again, the sensor 64 includes an emitter 70, a detector 72a, 72b and optionally a reflector 74. In aspects, the emitter 70 is mounted to the bezel 60. In alternative aspects, the sensor 64 includes just a detector 72a. In aspects, the detector 72b or optional reflector 74 are positioned on a second support arm 152. In yet further alterative, or additional aspects, the spring loaded push button 140 includes an element 149 that triggers the sensor 64, when positioned near a detector 72a, 72b.

Figure 12:
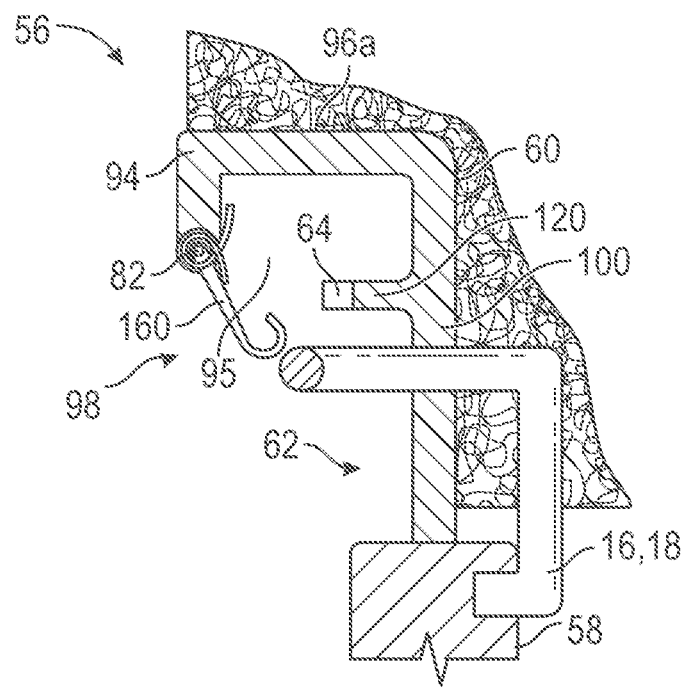
FIG. 12 illustrates yet another aspect of a sensing device including a door forced upward upon the insertion of a connector.

FIG. 12 illustrates yet an additional aspect of the present disclosure wherein the sensing device 56 includes a swing arm 160 that is forced upward towards a sensor 64 mounted in the rear 100 of the bezel 60 when a child restraint seat connector 54 is forced into the an upper portion 95 of the volume 62 at least partially defined by the bezel 60. The swing arm 160 is coupled to a lip 94 at a pivot 82 extending from the upper surface or first portion 96a of the bezel 60 near an opening 98 defined by the bezel 60. When the child restraint seat connector 54 is removed, a spring 90 moves the swing arm 160 away from the rear 100 of the bezel 60 and downward from the upper surface 96 of the bezel 60. As yet another option, a rotary potentiometer or encoder sensor can be attached to the pivot 82 to detect swing arm 160 rotation.

It is to be appreciated that in aspects, any combination of sensing devices 56, including those depicted in FIGS. 5, 7, 8A, 8B, 9A, 9B, 10A, 10B, 11A, 11B and 12, may be used for a single passenger seat 32. For example, in aspects, all of the sensing devices 56 used for the lower anchors 16 are the same as the sensing device 56 used for the tether anchor 18. In alternative aspects, the sensing devices 56 used for the lower anchors 16 may be different from the sensing device 56 used for the tether anchor 18. In yet alternative aspects, the sensing devices 56 used for each lower anchor 16 and the tether anchor 18 may be different.

Figure 13:
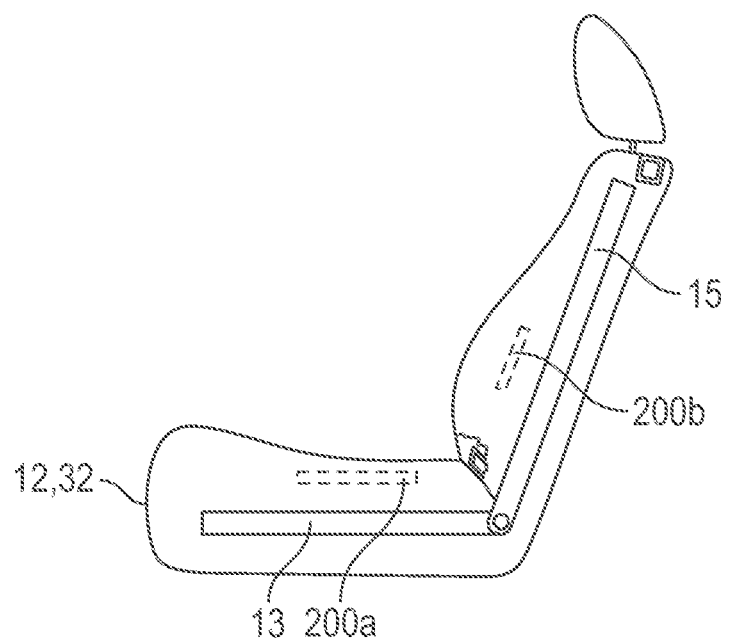
FIG. 13 illustrates an aspect of pressure sensors positioned within a passenger seat.

It is to be further appreciated that in additional aspects of the above, one or more pressure sensors 200a, 200b (collectively referred to herein as pressure sensors 200), as seen in FIG. 13, may be used to supplement the sensing devices 56 described above for detecting the presence of a child restraint seat 10 (see FIG. 1). As illustrated, the pressure sensors 200a, 200b are located in the seat base 13, in the seat back 15, or located in both. When the child restraint seat 10 (see FIG. 1) is placed into the passenger seat 12 the pressure sensors 200 are triggered and send a signal to the processor 76. In aspects, reviewing the status of the sensors 64 associated with the anchors 16, 18 in combination with the status of the pressure sensors 200 may assist in determining when the correct anchors 16, 18 have been used with the child restraint seat 10.

Figure 14:
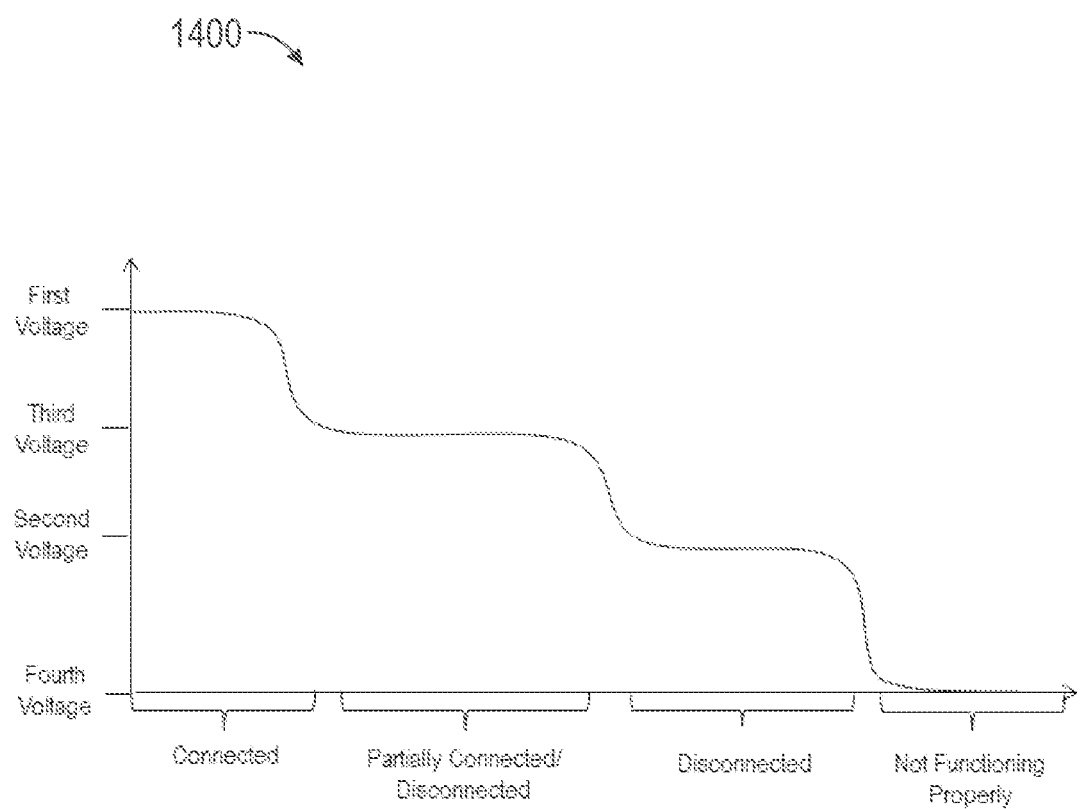
FIG. 14 illustrates a plot of first, second, third and fourth voltages indicated by a sensor, relative to each other.

Further, in the aspects of devices shown in FIGS. 5, 7, 8A, 8B, 9A, 9B, 11A, 11B, and 12, the sensors 64, 65, 83, 86 are triggered and indicate a first voltage or other output, when e.g., 1. the connector 54 is inserted into the defined volume 62; 2. a spring 90, 90a, 90b or element 149 moves within proximity of the sensor 64, 86 detection range; or 3. the sensor is triggered by a pushrod 110, when a child restraint seat connector 54 is coupled to a lower anchor 16 or tether anchor 18. It may further be appreciated that the sensors 64, 86 may also indicate a second voltage or other output, different from the first output, when the connector 54, spring 90, 90a, 90b, element 149 or pushrod 110, are not present, such as when a child restraint seat connector 54 is not inserted or not completely inserted into the volume 62 and coupled to the lower anchor 16 or tether anchor 18. This, second output state may indicate a background component due to the detection, e.g., of the lower anchor 16 or tether anchor 18, a structural element 58 including a portion 96b of the bezel 60, a door 80, or a given light level. It yet may further be appreciated that the sensors 64, 86 may also detect a partial presence, indicating a third voltage or other output, between the first output and the second output, of a connector 54, spring 90, 90a, 90b, element 149 or pushrod 110, such as when a child restraint seat connector 54 is partially inserted into the volume 62, or not inserted into the volume 62 at all and not coupled, or disconnected to the lower anchor 16 or tether anchor 18. In yet further aspects, if the sensor 64 is not functioning properly, the sensor 64 indicates a fourth voltage or other output, which less than the second output. In aspects, the fourth output is a no-voltage output state. FIG. 14 illustrates an aspect of four different voltage states relative to each other including a first voltage, second voltage, third voltage and fourth voltage, described herein. It may be appreciated that transitions between the voltage states may exist, which contribute to the curvature that is illustrated between the four voltage states.

In view of the variations in detection in the aspects noted above, FIG. 8A illustrates an approach wherein the spring 90, in further aspects, is formed from a stamped sheet of metal where the distal end 106 is in proximity to a second sensor 65 when the connector 54 is not attached around the lower anchor 16 or tether anchor 18. Thus, the second sensor 65 detects the presence of the distal end 106 of the spring 90 when the connector 54 is not affixed to the lower anchor 16 or tether anchor 18. When the connector 54 is attached to the lower anchor 16 or tether anchor 18, then the spring 90 is pushed upward causing the hole 93 in the spring 90 to at least partially align, and in some aspects completely align, with the second sensor 65. In this state with the child restraint seat connector 54 attached to the anchor, 16, 18, the second sensor 65 will partially detect the spring 90 when the hole 93 is located to partially line up with the sensor 65 (as illustrated) or not detect the spring 90 when the hole 93 is located to completely line up with the second sensor 65. Likewise, the distal end 106 of the spring 90 may be located to interface with the first sensor 64 so that a reduced or partial signal is produced when the child restraint seat connector 54 is not attached to the lower anchor 16 or tether anchor 18. When the connector 54 is attached to the lower anchor 16 or tether anchor 18, then the spring 90 is pushed upward causing the distal end 106 of the spring 90 to completely align, with the first sensor 64 so that a full signal is produced when the child restraint seat connector 54 is attached to the lower anchor 16 or tether anchor 18. Thus two or three different levels or magnitudes of signal can be detected by sensors 65 and 64.

It may further be appreciated from the illustrations and description provided with reference to FIGS. 8A, 8B, 9A, 9B, 11A, 11B, 11C, and 12 that the child restraint seat connector 54 may move a movable element, such as a spring 90, 90a, 90b, a spring loaded push button 140, or swing arm 160, which in aspects exhibit a smaller portion having a reduced area, such as a hole (as illustrated in FIG. 8a), a reduction in volume, or a necked location, which is detected by the second sensor 65.

In aspects, the second sensor 65 includes an emitter 71 and a detector 73a, which are both present on the support arm 102. In alternative aspects, the second sensor 65 includes an emitter 71 on the support arm 102 and a detector 73b coupled to the bezel 60. In further alternative aspects, the second sensor 65 includes an emitter 71 located at the support arm 102, a reflector 75 opposing the emitter 71 mounted to the bezel 60, and a detector 73a positioned adjacent to the emitter 71. It may further be appreciated that the arrangement of the second sensor 65 components, i.e., emitter 71, the detector 73a, 73b and the reflector 75 (if present) may be inverted, such that the emitter 71 is coupled to the bezel 60 and the detector 73b or reflector 75 is connected to the support arm 102. And, in yet further alternative aspects, only a detector 73 may be present to form the sensor 65. Sensors 65 include those enumerated above.

It may therefore be appreciated that partial detection may be beneficial for diagnostics, as some level of signal will always be detected whether or not the child restraint seat connector 54 is attached to a lower anchor 16 or tether anchor 18. Thus, if a sensor malfunctions and produces no output, it indicates is a different output than if the sensor is functioning properly and is providing some magnitude of signal output. This approach with partial detection can be applied to all of the rotational or translational concept embodiments herein.

A lower and upper anchor use detection sensing device of the present disclosure offers several advantages. These include the ability to detect the presence of a child restraint seat, which may be used to make various determinations, including whether an airbag is to be deployed or whether a seatbelt indicator is to be activated.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A child restraint seat sensing system for a vehicle having a vehicle passenger seat, the child restraint seat sensing system comprising:
a structural element defining a volume disposed within the structural element, wherein the structural element is located in the vehicle passenger seat between a seat base and a seat back or is located behind the vehicle passenger seat;
a stationary anchor directly connected to the structural element and disposed entirely within the volume; and
a sensor mounted to the structural element within the volume, wherein the sensor includes an emitter and a detector and the sensor is configured to detect a child restraint seat connector disposed between the emitter and the detector within the volume.

2. The child restraint seat sensing system of claim 1, wherein the structural element includes a bezel connected to a cross member, the volume is defined by the bezel and the cross member, and further comprising a first portion disposed on the bezel and a second portion disposed on the cross member spaced apart from the first portion.

3. The child restraint seat sensing system of claim 2, wherein the emitter is coupled to the first portion of the structural element and the detector is coupled to the second portion of the structural element opposing the first portion, and wherein when the child restraint seat connector is attached to the stationary anchor the child restraint seat connector passes between the emitter and the detector.

4. The child restraint seat sensing system of claim 2, wherein the emitter is coupled to the second portion of the structural element and the detector is coupled to the first portion of the structural element opposing the second portion, and wherein when the child restraint seat connector is attached to the stationary anchor the child restraint seat connector passes between the emitter and the detector.

5. The child restraint seat sensing system of claim 1, wherein the structural element includes a bezel connected to a cross member, and the volume is defined by the bezel and the cross member.

6. The child restraint seat sensing system of claim 5, wherein the structural element defines an opening in communication with the volume and the sensor is disposed between the opening and the stationary anchor.

7. The child restraint seat sensing system of claim 1, wherein the sensor in a first condition directly detects the child restraint seat connector within the volume and in a second condition does not directly detect the child restraint connector within the volume.

8. The child restraint seat sensing system of claim 1, wherein the sensor is configured to provide at least two of: a first output when the child restraint seat connector is attached to the stationary anchor, a second output when the child restraint seat connector is not attached to the stationary anchor, a third output when the child restraint seat connector is partially disposed within the volume, and no output when the sensor malfunctions.

9. The child restraint seat sensing system of claim 1, wherein the sensor is aft of the stationary anchor relative to an opening for receiving the child restraint seat connector defined in the structural element.

10. The child restraint seat sensing system of claim 1, further comprising one or more occupancy sensors positioned within the vehicle passenger seat.

11. The child restraint seat sensing system of claim 1, further comprising a processor in communication with the sensor.

12. The child restraint seat sensing system of claim 1, wherein the emitter and the detector consist of an array of sensors.

13. A child restraint seat sensing system for a vehicle having a vehicle passenger seat, the child restraint seat sensing system comprising:
a structural element defining a volume disposed within the structural element, wherein the structural element is located in the vehicle passenger seat between a seat base and a seat back or is located behind the vehicle passenger seat, and wherein the structural element is one of a vehicle structure or a seat structure;
a stationary anchor directly connected to the structural element and disposed entirely within the volume;
a child restraint seat connector having a connecting portion at an end thereof, wherein when in a first position the child restraint seat connector is within the volume and the connecting portion is connected to the stationary anchor and when in a second position the child restraint seat connector is not disposed within the volume; and
a sensor mounted to the structural element within the volume, wherein the sensor includes an emitter, a reflector, and a detector, and wherein the sensor directly senses the child restraint seat connector is disposed within the volume between the reflector and the emitter when in the first position and does not directly sense the child restraint seat connector when in the second position.

14. The child restraint seat sensing system of claim 13, wherein the structural element includes a bezel connected to a cross member, the volume is defined by the bezel and the cross member, and further comprising a first portion disposed on the bezel and a second portion disposed on the cross member spaced apart from the first portion.

15. The child restraint seat sensing system of claim 14, wherein the emitter and the detector are coupled to the first portion of the structural element and the reflector is coupled to the second portion of the structural element opposing the first portion, and wherein when the child restraint seat connector is in the first position the child restraint seat connector is disposed between the emitter and the reflector.

16. The child restraint seat sensing system of claim 14, wherein the emitter and the detector are coupled to the second portion of the structural element and the reflector is coupled to the first portion of the structural element opposing the second portion, and wherein when the child restraint seat connector is in the first position the child restraint seat connector is disposed between the emitter and the reflector.

17. The child restraint seat sensing system of claim 14, wherein the stationary anchor is connected at its ends adjacent to the bezel.

18. The child restraint seat sensing system of claim 14, wherein the stationary anchor is connected at its ends to the cross member.

19. The child restraint seat sensing system of claim 13, wherein the emitter, reflector, and the detector consist of an array of sensors.

20. The child restraint seat sensing system of claim 13, wherein the sensor is configured to provide at least two of the following: a first output when the child restraint seat connector is in the first position, a second output when the child restraint seat connector is in the second position, a third output when the child restraint seat connector is in a third position where the child restraint seat connector is partially disposed within the volume and the connecting portion is not connected to the stationary anchor, and no output when the sensor malfunctions.

* * * * *